United States Patent Office 3,470,019
Patented Sept. 30, 1969

3,470,019
PLATINUM COATING COMPOSITION, PROCESS
AND PLATINUM-COATED MATERIALS
Raymond Steele, West Chester, Pa., assignor, by mesne assignments, to Matthey Bishop, Inc., Malvern, Pa., a corporation of Pennsylvania
No Drawing. Filed Feb. 4, 1965, Ser. No. 430,474
Int. Cl. H01b 1/02; B44d 1/00; C03c 25/04
U.S. Cl. 117—227
15 Claims

ABSTRACT OF THE DISCLOSURE

The present invention relates to the preparation of a colloidal dispersion of platinum, to the dispersion and to its use in forming platinum deposits. Platinum dioxide is reduced to colloidal platinum by reaction with a lower alcohol-formaldehyde mixture. The dispersion may be made to contain minor amounts of other platinum group metals, in addition to platinum. When this dispersion is coated on substrates and dried out, adherent, catalytically active platinum deposits are formed.

---

The present invention relates to novel platinum containing compositions for use in coating or impregnating, to the coatings thus obtained, the process of making dispersions of platinum black and processes of coating platinum.

A purpose of this invention is to obtain quickly and conveniently platinum coatings, especially on metals, plastics, ceramics, carbon and on various carriers for supported catalysts or other bases.

A further purpose is to make platinum coatings adhere tenaciously to these bases.

A further purpose is to produce platinum coatings which are catalytically active.

A further purpose is to produce platinum coatings which improve the resistance of the coated articles to corrosion and/or erosion.

A further purpose is to produce platinum coatings on a variety of substrates without the need to employ a damaging amount of heat in the coating operation.

In the prior art active and stable platinum dispersions have been prepared by reducing the metal from suitable salts, generally chloroplatinates, in the presence of protective colloids such as gum arabic, gelatin, collodium, polyvinyl alcohol, etc. The dilute sols generally obtained have been used as catalysts and to a limited extent have been employed in the past to impregnate active catalyst carriers. The more modern methods of coating platinum on various substrates for various purposes are reviewed below.

Platinum Metals Review (October 1958) refers to metallizing preparations used in the decoration of glassware and glazed ceramics. These have comprised solutions of the resinates or sulpho-resinates of platinum and the other noble metals in essential oils. They are applied by brush, dried and fired at temperatures ranging from 550° to 800° C. during which the essential oils are burnt away, the resinates and the sulpho-resinates decompose and a bright, adherent film of platinum is left behind on the ware. British Patent 952,493 refers to a viscous platinizing preparation formed by reacting chloroplatinic acid and di-iso-propyl ether. This is applied to a refractory surface and heated to decompose the liquid to platinum metal. A fine, adherent film of platinum is formed but many such applications, each followed by a furnace heating step, are necessary to form a coating of appreciable thickness. The same patent discloses a process for producing thick deposits on refractories which consists of applying a dispersion of platinum flake in a liquid which will volatilize or decompose upon heating and then heating to sinter the coating. U.S. Patent 3,136,658 discloses the method of forming protective and electrical conductive coatings on refractories by spraying on molten platinum and U.S. Patent 3,125,539 relates to the flame spraying of catalytic platinum deposits onto inactive, fired ceramic pellets.

Application of platinum to active catalyst carriers, that is to those highly porous materials with large surface areas such as silica gel, activated carbon, activated alumina, etc., is genrally accomplished by impregnating with solutions of platinum compounds such as chloroplatinic acid, tetrammine platinous chloride, etc., folfowed by chemical or thermal reduction of the platinum compound to metal. In some cases platinum compounds are co-precipitated or otherwise mixed with the carrier material during an earlier stage in the preparation of the catalyst.

Practical means of the direct deposition of platinum on plastics, without interposing another material, are not known or have not been revealed.

The deposition of platinum on electrode structures made from resistant metals such as titanium, tantalum, zirconium, graphite, lead, silver, nickel, etc., has received considerable attention in recent years. Sound, adherent deposits of platinum on most of these metals can be obtained by electroplating, but such deposits with the exception of the well known, extremely fragile platinum black deposit, have poor catalytic activity for electrode reactions involving the discharge of gases such as chlorine, hydrogen or oxygen. Electroplated deposits tend to become "passive" and higher voltages must be applied to carry out electrode reactions at desired rates. Fuel cell electrode reactions involving the combination of fuels and oxygen with ions in an electrolyte must be carried out in the presence of active catalysts to attain practical reaction rates.

Processes for improving the activity of electroplated platinum on titanium by post-plating treatments are disclosed in British Patents 918,328 and 957,703 (my U.S. patent applications 127,480, U.S. Patent 3,254,015 and 197,938, U.S. Patent 3,202,594). In the former the post treatment consists of electrolyzing the plated platinum cathodically and subsequently heating it at 800° F. In the latter that treatment is followed by an amalgamation of the platinum surface and then volatilization of the mercury. Another process, also claimed to develop an active platinum deposit, is disclosed in U.S. Patent 3,055,-811. In this an amorphous layer of platinum is electrodeposited on a titanium surface and then heated in the range 600°–1000° F. in the presence of an air stream containing hydrocarbon vapors for a time sufficient to initiate catalytic oxidation of the vapors on the platinum surface.

"Chemi-deposited" platinum electrode surfaces are not new to the art. U.S. Patent 2,719,797 disclosed a method of obtaining an adherent deposit of platinum on tantalum and columbium by coating with a solution of chloroplatinic acid in a mixture of isopropyl alcohol and ethyl acetoacetate, heating first at 250° C. to decompose the chloroplatinic acid and then in the range of 800° to 1400° C. in an inert atmosphere to bond the platinum to the tantalum. U.S. Patent 3,117,023 reveals the deposition of platinum on tantalum by coating with a solution of chloroplatinic acid containing hydroxylamine hydrochloride and heating to about 500° C. to cause the noble metal to be reduced and deposited as a thin film on the base metal. British Patent 885,819 and Canadian Patent 671,035 disclose coating titantium with a platinum bearing preparation containing a platinum compound in an organic vehicle and heating to at least 500° C. to produce a deposit consisting essentially of platinum. Good voltage characteristics are claimed for this deposit and more recently for another deposit, disclosed in British Patent 964,631 which contains 0.1 to 0.7% carbon and which may be obtained by coating with an organic solution of chloroplatinic acid and a chelate former such as aceytlacetone, acetoacetic ester, etc., and decomposing at temperatures from 170° to 400° C. Still another active "chemi-deposit" revealed in British Patent 964,913 is formed by coating substrates with a solution of platinum group metals in an organic solvent and then heating at a temperature of 350° C. or more in an atmosphere of town gas and ammonia.

I find that I can create a dispersion of platinum black in an aliphatic alcohol between $C_2$ and $C_5$ inclusive by reduction of platinum oxide in an alcohol-formaldehyde solution. This dispersion has a distinctive characteristic in that when it is coated on a suitable surface and allowed to dry the platinum black coalesces into a coherent and adherent metallic film. The final stage of the drying out process is accompanied by an oxidation, catalyzed by the platinum itself, of residual, adsorbed organic matter. Some heat is generated during this momentary oxidation and it appears that this has the effect of increasing the attractive forces between the very active particles of platinum causing them to bond together and to the underlying surface. When applied to high surface area substrates such as Cab-O-Sil (a submicroscopic pyrogenic silica) or shredded asbestos, a significant amount of heat may develop at this stage. On the other hand, when applied to relatively smooth surfaces, on plastics for example, the heat generated is not noticeable and is insufficient to damage the surface.

The platinum dispersion is preferably applied in a series of thin coats, each to be dried out before application of the next. The amount of platinum which can be applied per coat is a matter of the character of the surface upon which it is being deposited. It is apparent that an active substrate with a high specific surface area will take more platinum per coat than a substrate whose real surface area more closely approaches its geometric area. When coating smooth surfaces puddling must be particularly avoided since crazing and cracking of the deposit may occur in those areas of heavier deposition. The coating may be done by brushing, spraying, dipping, soaking or by means of various special applicators. The time required to build up a platinum deposit may be considerably shortened by providing a current of air to hasten evaporation of the vehicle. Use of a hot air blower to dry out the dispersion immediately after it is applied to the surface is preferred and by this means a series of coats may be applied in quick succession. Where the substrates will withstand high temperatures, refractory ceramics for example, the steps of heating the refractory with a torch and spraying on the platinum dispersion can be alternated to achieve desired coating thickness quite rapidly.

The platinum oxide ($PtO_2$ or $PtO_2 \cdot H_2O$) made use of in this invention is a brown powder sometimes referred to as Adam's catalyst. Its past use has been largely as a catalyst in the hydrogenation of organic compounds. It is generally made by reacting chloroplatinic acid, ammonium chloroplatinate, potassium chloroplatinate or other platinum compounds with molten sodium nitrate. The chloroplatinate salts may be made to contain various amounts of the other platinum group metals in which case the products formed will contain an intimate and sometimes advantageous mixture of the platinum group metal oxides. A novel process for producing platinum oxide consists of electrolyzing platinum anodically in molten sodium nitrate containing an alkali metal chloride. This is disclosed in my U.S. patent application 370,690, which resulted in U.S. Patent 3,357,904. Among the advantages of the latter process are that thick platinum plate can be converted directly, rapidly and in high yield to the oxide powder. The conversion of platinum oxide to the platinizing composition of this invention is a single step operation. Thus, the total elapsed time for converting platinum plate to this platinizing solution can be less than one week and it will be appreciated that this is advantageous when considering the need to keep "tie up" of this valuable metal at a minimum.

An aliphatic alcohol in the range between $C_2$ and $C_5$ is employed. Suitable alcohols are ethyl, 1-propanol (normal), 2-propanol (iso), 1-butanol (normal), isobutanol, amyl alcohol (normal), isoamyl alcohol and tertiary amyl alcohol. Denatured alcohol, Formula 3A has been used in the experimental preparations. This contains one volume of methyl alcohol to twenty volumes of ethyl alcohol. The formaldehyde is preferably employed in the usual reagent form, that is as a water solution containing 37% formaldehyde and 10%–15% methyl alcohol. It will thus be evident that the maximum concentration of formaldehyde by weight in the dispersion is 37%. Methyl alcohol, beyond that present in the formaldehyde and denatured ethyl alcohol, is not recommended because in an experiment in which it was used the dispersion spontaneously caught fire when exposed to the air.

The following examples illustrate the preparation of the platinizing solutions of this invention.

EXAMPLE 1

A series of samples of platinum oxide, each weighing 2.5 grams, were placed in 50 cc. glass beakers. To each of the samples was added a solution containing 12.5 cc. of one of the alcohols listed above mixed with 12.5 cc. of formaldehyde (37% solution). Prior to adding this solution carbon dioxide was run into the covered beaker through a glass tube to expel air. This was continued during the reaction and following the reaction while the solution was cooling off. After adding the alcohol-formaldehyde solution the beaker was heated in a water bath until the reaction started. This occurred for the various samples in the range 33° to 49° C. The reaction was characterized by the evolution of gas, some foaming, a rise in temperature to the range 55° to 75° C. and a change in color as the brown platinum oxide was reduced to the black platinum dispersion. Apparently stable dispersions were obtained in every case with only small amounts of platinum settling out as residues.

These dispersions were transferred to vials and examined again after standing for 90 days. It was observed that relatively small amounts of residue were present in the preparations made with the alcohol-formaldehyde mixtures in which ethyl, 1-propanol, 1-butanol, butanol (iso) and amyl alcohol (tertiary) were employed. Those made with the mixtures containing 2-propanol (iso), amyl alcohol and iso amyl alcohol had decomposed leaving the platinum in the form of a residual sludge under a clear solution.

EXAMPLE 2

Further samples of platinum oxide were reacted in the manner described in Example 1 except that instead of using an alcohol-formaldehyde mixture in one case formaldehyde alone was used, in another ethyl alcohol alone was used, in another 1-propanol (normal) alone was used and in another amyl alcohol (normal) alone was used. Dispersions of platinum black were produced through reduction in the formaldehyde, the ethyl alcohol and the amyl alcohol but in these cases somewhat more platinum residue was produced than with the preparations in Example 1. All of the platinum settled out from the 1-propanol solution. When examined after 90 days it was found that very little change, if any, had occurred in the ethyl and amyl alcohol solutions. The formaldehyde solution had undergone almost complete decomposition.

EXAMPLE 3

A 1.0 gram sample of platinum oxide was reacted with 5 cc. formaldehyde in the manner described in Example 1. Following the reaction the dispersion was diluted with 5 cc. of ethyl alcohol before use.

EXAMPLE 4

Ten grams of platinum oxide was placed in a 200 cc. beaker and carbon dioxide was run in as in the preceding examples. Eighty cc. of ethyl alcohol was added and the beaker was heated in the water bath. The reaction began at about 60° C. and this temperature had to be maintained to enable the reaction to proceed to completion. The solution was diluted with ethyl alcohol to 138 cc. and bottled. It was noted that considerable sludge was on the bottom of the reaction beaker.

EXAMPLE 5

Ten grams of platinum oxide was placed in a 200 cc. beaker. Carbon dioxide was run in as in the preceding examples. Ten cc. of formaldehyde and 90 cc. of ethyl alcohol were mixed and added to the platinum oxide. The beaker was heated in a water bath until the reaction began at about 50° C. The temperature rose to about 60° C. at which point it slowed down although the reaction was obviously incomplete. The beaker was heated further and the reaction continued with a temperature rise to 76° C. The solution was diluted with alcohol to 138 cc. (0.06 gms. Pt/cc.) and bottled. There was very little residue.

EXAMPLE 6

Ten grams of platinum oxide containing 8.28 grams of platinum was placed in a 200 cc. beaker. Carbon dioxide was run in as in the preceding examples. Twenty-five cc. of ethyl alcohol and 25 cc. of formaldehyde were mixed and added to the platinum oxide. The beaker was heated in a water bath. The reaction began at 49° C. and the temperature rose to 82° C. as the reaction proceeded. The solution was diluted to 69 cc. (0.120 gms. Pt/cc.) and bottled.

EXAMPLE 7

One hundred grams of platinum oxide containing 83.5 grams of platinum was placed in a 4000 cc. beaker. Carbon dioxide was run in as in the preceding examples. Five hundred cc. of ethyl alcohol and 500 cc. of formaldehyde were mixed and added to the platinum oxide. The beaker was heated in the water bath. The reaction began at 52° C. and the temperature rose to 74° C. as the reaction proceeded. When complete, the solution was cooled under carbon dioxide as usual, diluted with ethyl alcohol to 1392 cc. (0.06 grams Pt/cc.) and bottled.

EXAMPLE 8

Two and five-tenths grams of a platinum-ruthenium oxide containing 2.03 grams platinum-5% ruthenium was placed in a 200 cc. beaker and moistened with 2 cc. water. Carbon dioxide was run in as in the preceding examples. Twelve and five-tenths cc. of ethyl alcohol and 12.5 cc. of formaldehyde were mixed and added. With no applied heat the reaction began in about 5 minutes at a temperature of 25° C. The temperature rose to 45° C. as the reaction proceeded. When cool, the solution was diluted with ethyl alcohol to 34 cc. (0.06 grams Pt-Ru/cc.) and bottled.

EXAMPLE 9

Two and five-tenths grams of platinum-rhodium oxide containing 2.10 grams of platinum-5% rhodium was placed in a 200 cc. beaker and moistened with 2 cc. water. Carbon dioxide was run in as in the preceding examples. Twelve and five-tenths cc. of ethyl alcohol and 12.5 cc. formaldehyde were mixed and added. Heating was started on the water bath. The reaction began at 28° C. and the temperature rose to 60° C. as the reaction proceeded. When cool, the solution was diluted with ethyl alcohol to 34 cc. (0.06 gms. Pt-Rh/cc.) and bottled.

EXAMPLE 10

Two and five-tenths grams of platinum-iridium oxide containing 2.10 grams of platinum-5% iridium was placed in a 200 cc. beaker and moistened with 2 cc. of water. Carbon dioxide was run in as in the preceding examples. Twelve and five-tenths cc. ethyl alcohol and 12.5 cc. formaldehyde were mixed and added. Heating was started on the water bath. The reaction began at 30° C. and the temperature rose to 60° C. as the reaction proceeded. When cool, the solution was diluted with ethyl alcohol to 34 cc. (0.06 gms. Pt-Ir/cc.) and bottled.

EXAMPLE 11

Two and five-tenths grams of platinum-ruthenium oxide containing 2.03 grams of platinum-15.2% ruthenium was placed in a 200 cc. beaker and moistened with 2 cc. water. Twelve and five-tenths cc. ethyl alcohol and 12.5 cc. formaldehyde were mixed and added. The reaction began immediately at about 26° C. and the temperature rose to 54° C. as the reaction proceeded. When cool the solution was diluted with ethyl alcohol to 33 cc. (0.06 gms. Pt-Ru/cc.) and bottled.

EXAMPLE 12

Two and five-tenths grams of platinum-rhodium oxide containing 2.05 grams of platinum-11.6% rhodium was placed in a 200 cc. beaker and moistened with 2 cc. water. Twelve and five-tenths cc. of ethyl alcohol and 12.5 cc. formaldehyde were mixed and added. Heating was started on the water bath. The reaction began at about 40° C. and the temperature rose to 69° C. as the reaction proceeded. When cool the solution was diluted with ethyl alcohol to 35 cc. (0.06 gms. Pt-Rh/cc.) and bottled.

In most of the foregoing illustrations heat was applied to initiate the reaction between platinum oxide and the alcohol-formaldehyde reagent. Batches of platinum oxide differ somewhat in their reactivity with these reagents. In some cases no external heat is necessary. The mixed metal oxides tend to be excessively reactive and these are first moistened with water to reduce foaming. In all cases the reaction is carried out under carbon dioxide to avoid fire risk.

All of the dispersions of these examples formed adherent deposits when brushed on a platinum surface and dried out with a hot air blower. The dispersions formed with the ethyl alcohol-formaldehyde have been very convenient to use in the platinizing of various specimens for experimental trials. Relative concentrations of the alcohol and formaldehyde do not appear to be critical nor is the presence of some water in the dispersion harmful. Those dispersions produced in poor yield or subject to decomposition upon prolonged standing are, nevertheless, within the scope of this invention since they are capable of forming platinum deposits.

This characteristic of forming a dispersion with these reagents does not appear to be shared by the other metals of the platinum group. Palladium oxide by itself, for example, cannot be converted into a palladium black dispersion in the manner of this invention and it is believed that the ability of platinum to carry other metals into co-dispersion depends upon the intimacy of their mixture in the oxides from which the dispersions are produced. Deposits formed on polyethylene sheet from the dispersions of Examples 11 and 12, which carried 15.2% ruthenium and 11.6% rhodium respectively, though sound and adherent, were noticeably darker and lacking in the metallic sheen of a deposit from the pure platinum dispersion of Example 7, indicating that the particles of ruthenium and rhodium black had not undergone the same physical change as the platinum but were literally cemented into the film by the platinum. The coherence and adherence of the platinum deposits on smooth surfaces probably diminishes as the content of other metals increases and it is uncertain that satisfactory deposits can be had on the smoother surfaces where the other metals total over 20% or 25% of the deposit. However, larger proportions of other metals can be tolerated in deposits impregnated into active catalyst carriers where the mechanical locking is contributed by the pores is the major factor in the retention of the deposit. Therefore, the presence of another metal, or mixture of metals, up to 50% of the metal content of the dispersion is included within the scope of this invention.

When the platinizing solution is applied to a receptive surface, kept warm and dried by means of a hot air blower, the deposit formed appears to have very little stress. The temperature of the hot air streams from the blowers used in the platinizing experiments were measured by holding a thermometer at a distance of 2–3 inches from the end of each blower, or duct delivering air from the blower, for a minute or more until no further rise occurred. Temperatures ranging from 150° to 170° C. were obtained. Temperatures to which surfaces being platinized were heated would be considerably less since the blower is only directed against the work very briefly. While platinizing a large titanium electrode, for example, a thermometer was held in various positions on the work surface during the coating and temperature readings ranging from 55° to 85° were taken.

Many metals, plastics, porous catalyst carriers and rough, high fired refractory materials can be coated under these conditions. But deposits formed at these low temperatures on glass, porcelain and other smooth refractories tend to peel, forming flakes whose curvature is indicative of considerable stress. These materials can be coated satisfactorily by heating them to an elevated temperature (above 750° F.) and spraying on the platinizing solution.

Catalytic activity of platinum is associated with a large number of active centers-lattice dislocations, corners and edges of crystal grains, growthsteps, etc. It seems probable that a large number of these active centers are created in platinum deposits formed concurrently with the removal of organic mediums in which the platinum has been dispersed or while platinum is undergoing a physical change while catalyzing a reaction. In these respects it would appear that the deposits formed from the composition of this invention are similar to other chemideposits and to the deposit fomed as amorphous platinum catalyzes the oxidation of hydrocarbon vapors at elevated temperatures.

Active deposits can, however, be obtained more readily and on a wider variety of substrates through the use of the novel composition of this invention.

Various means of platinizing by use of these solutions, some of the substrates platinized, a few of the proposed uses for the platinized substrates and some data from evaluations are given in the following examples but without the intention of limiting the uses to those shown.

EXAMPLE 13

A solid piece of titanium 9" x 1" x 1/16" thick was etched for 30 seconds in a hydrochloric acid solution containing 1% hydrofluoric acid at room temperature and for 5 hours in a concentrated hydrochloric acid solution (S.G. 1.175) at a temperature of 30°–32° C. It was then removed from the acid, rinsed, dried and weighed. One square inch of the titanium surface was repeatedly coated by brushing on platinizing solution prepared as described in Example 7 and drying out by means of a current of hot air from an air heater blower (Master Appliance Corp. Model HG 301). By applying successive coatings the deposit was built up until it weighed 18 milligrams.

The first coating was applied to the titanium surface at room temperature to reduce risk of forming a superficial oxide film on the bare titanium. The hot air blower was then employed and subsequent coatings were applied to the warm platinized surface which was then immediately subjected to the hot air stream. As the catalytic oxidation was completed, the color of the platinum deposit changed from black to grey.

This titanium specimen was employed as an anode in an electrolytic chlorine cell of the diaphragm type, in which the electrolyte was a saturated brine solution at about 90° C. Electrolysis was carried out for 24 hours at an anode current density of 8 amperes per square inch of platinized surface. At the end of the 24-hour run the anode-to-cathode voltage was 4.35 volts. For comparison another titanium specimen was etched in the same manner and then an electroplated platinum deposit of the same weight was applied to an equal area. At the end of an identical 24 hour test in the same chlorine cell the anode-to-cathode voltage when employing the electroplated deposit was 4.98 volts.

It is evident from this test that the deposit obtained by means of the platinizing solution of this invention had superior activity when operated in a chlorine cell at a high current density.

EXAMPLE 14

Four metallic electrodes each of whose working surfaces was comprised of an expanded titanium sheet measuring 31" x 41" were etched (a) for 30 seconds in a concentrated hydrochloric acid solution containing 1% hydrofluoric acid at room temperature (b) for 2 hours in a hydrochloric acid solution (S.G. 1.155) at 30°–32° C. and (c) for 3 hours in another hydrochloric acid solution (S.G. 1.17) at 30°–32° C. Three of these were plated at 100 amperes for 3½ minutes in a dinitro sulfato platinum bath (known commercially as the Type II DNS solution) containing 8 grams of platinum per liter and held at a temperature of 50° C. Four and four-tenths grams of platinum were deposited electrolytically on each of these three electrodes. Each of the four electrodes was dried, weighed and the expanded titanium sheet was repeatedly coated with platinizing solution prepared as described in Example 7 above. A paint brush was used for the application and drying was carried out with a current of hot air from an air heater blower (Master Appliance Corp. Model AH 501) which was manipulated so that the current of air followed the stroke of the brush by 3–6 inches. Forty to forty-five grams of platinum were deposited on each electrode in this manner.

These four anodes were installed on an experimental basis in a mercury cathode type chlorine cell and run at current densities ranging from 3.0 to 3.6 amperes per square inch. After 28 weeks of operation they are still performing in the active, low voltage state. Similar electrodes on which the platinum was deposited electrolytically were installed in the same cell earlier and operated under the same conditions. They remained in the active, low voltage state for 25 days and then gradually assumed the high voltage state which is 0.5 volt above the low voltage of the active state.

It is seen that the deposits obtained by means of the platinizing solutions of this invention are capable of sustained, low voltage operation under the rigorous conditions in a chlorine cell.

EXAMPLE 15

Four pieces of nickel sheet 2.5 inches wide and 5 inches long having a specially active nickel coating, known as Raney nickel, on a 2.5" x 2" area of one side were used as test specimens. All of the pieces were washed with distilled water, rinsed with acetone, dried and weighed. The various specimens were coated with platinizing solutions prepared according to Examples 7, 8, 9, and 10.

ANODE POTENTIALS, CELL CURRENT

| Anode | 0.4 amps (v.) | 1 amp (v.) | 4 amps (v.) | 8 amps (v.) |
|---|---|---|---|---|
| (1) Pt Coated | 0.413 | 0.448 | 0.512 | 0.551 |
| (2) Pt-5% Ir coated | 0.378 | 0.419 | 0.447 | 0.526 |
| (3) Pt-5% Rh coated | 0.373 | 0.414 | 0.473 | 0.518 |
| (4) Pt-5% Ru coated | 0.419 | 0.445 | 0.488 | 0.517 |
| (5) Raney nickel only | 0.436 | 0.460 | 0.498 | 0.525 |

CATHODE POTENTIALS, CELL CURRENT

| Cathode | 0.4 amps (v.) | 1 amp (v.) | 4 amps (v.) | 8 amps (v.) |
|---|---|---|---|---|
| (1) Pt coated | 0.928 | 0.946 | 0.978 | 1.0 |
| (2) Pt-5% Ir coated | 0.926 | 0.940 | 0.974 | 0.997 |
| (3) Pt-5% Rh coated | 0.916 | 0.930 | 0.955 | 0.981 |
| (4) Pt-5% Ru coated | 0.925 | 0.940 | 0.965 | 0.987 |
| (5) Raney nickel only | 0.970 | 0.995 | 1.025 | 1.09 |

From the above it is seen that the excellent electrode characteristics of Raney nickel are further enhanced by these platinized coatings. All of the platinizing treatments brought about improvements in the performance of the specimens when used as cathodes and the mixed platinum metal deposits improve the performance of the anodes.

Preformed fuel cell electrode substrates, 3″ x 3″ x 70 mesh nickel screens and 3″ x 3″ x 50 mesh tantalum screens containing a porous layer of carbon and polytetrafluoroethylene, were plantinized with solutions prepared according to Examples 7, 8, 9, and 10. Each platinizing solution was applied by brush at room temperature in an amount sufficient to soak the substrate. The specimen was allowed to stand for a minute or more and then dried out thoroughly with the hot air blower. Three or four coats were applied to each side in this manner to obtain a concentration of approximately 2 milligrams of platinum metal per square centimeter. It was noted that the electrodes became quite warm as the coatings dried out and the last of the vehicle was catalytically oxidized.

These specimens were prepared for trials aimed at determining the relative merits of deposits of platinum, platinum-ruthenium, platinum-rhodium and platinum-iridium in catalyzing fuel cell electrode reactions. Previous evidence indicated that this platinizing procedure was effective in producing active electrodes.

EXAMPLE 17

Twelve grams of fine graphitic carbon powder was placed in a 50 cc. beaker. One cc. of the platinizing solution, prepared according to Example 7 and containing 0.06 gram of platinum was diluted to 7 cc. with ethyl alcohol and stirred into the powder. The small excess of liquid was evaporated while stirring the powder in the beaker. The pasty sludge was then transferred to a porcelain dish where evaporation was continued while stirring. Drying was completed in the oven at 110° C.

When cool the carbon was returned to the beaker, carbon dioxide was run in to expel air and another 0.06 gram of platinum in 7 cc. of solution was added as before. The evaporation and drying out were then carried out as with the first coat.

Addition of this inflammable liquid to a fine powder coated with catalytic platinum is safely carried out under a blanket of carbon dioxide as when applying the second platinum coating in this example.

This approximate 1% platinum coated carbon powder was intended for trial incorporation into fuel cell electrodes.

EXAMPLE 18

Fourteen grams of fine tantalum powder was placed in a 30 cc. porcelain crucible. Carbon dioxide was run into the crucible to displace air. Thirteen cc. of the platinizing solution, prepared according to Example 7 and containing 0.78 gram of platinum, was measured in a graduate. A portion of this was stirred into the tantalum powder to thoroughly moisten it. The crucible was heated on a hot plate. As evaporation took place further platinizing solution was stirred in keeping the power moist until all of the solution had been added. The powder was then thoroughly dried on the hot plate and cooled while still under carbon dioxide.

This coating and drying out was carried out under carbon dioxide since a previous experience in which plantinized tantalum powder was dried in a current of warm air resulted in ignition of the tantalum powder during the final stage of drying at which catalytic oxidation occurs.

This approximate 5% platinum coated tantalum powder was intended for trial incorporation into fuel cell electrodes.

Titanium, alumina, silica, thoria and magnesia powders have also been coated with platinizing composition.

EXAMPLE 19

Four 2″ x 2″ pieces of 80 mesh gauze made from platinum 10% rhodium wire were platinized by heating each one with the hot air blower, brushing on platinizing solution prepared according to Example 7, and heating again with the blower.

Three of the specimens were coated with 0.05, 0.08 and 0.12 gram of platinum by repeating the coating as necessary. A 2″ x 1″ area on the fourth specimen was coated in the same manner iwth 0.04 gram of platinum. The deposits were metallic in appearance and slightly darker than the untreated gauze. The plantinized gauze was somewhat stiffer.

When exposed to a stream of hydrogen in the presence of air the platinized portion of the fourth gauze glowed rapidly and caused the hydrogen to ignite, whereas the untreated portion of the gauze caused no reaction. When the platinized portion of this gauze was dipped into a dilute solution of hydrogen peroxide a vigorous evolution of oxygen occurred, resulting from the catalyzed decomposition of the hydrogen peroxide. This greatly exceeded the rate of reaction when the untreated portion of the gauze was dipped into the peroxide solution.

The first three specimens were intended for trial in a process in which a hot ammonia-air-methane mixture is catalyzed to produce hydrocyanic acid. Difficulty is experienced in initiating this reaction with new gauzes and the object of this trial was to determine if a desirable activation was achieved by this coating. At a later date a 74-inch diameter gauze was coated with 75 grams of platinum in the same manner for a larger scale experiment.

EXAMPLE 20

Two hundred and eight grams of fired ceramic pellets about 1/8″ diameter x 3/16″–1/4″ long were placed in a 400 cc. beaker. Thirty-five cc. of the platinizing solution, prepared according to Example 7 and containing 2.1 grams of platinum, was added. The volume of solution was slightly in excess of that absorbed by these low porosity, inactive pellets. The pellets were tumbled and stirred in the beaker until the excess liquid had evaporated leaving practically all of the platinum on the pellets. The pellets were then transferred to a porcelain dish and stirred while drying with the hot air blower. Finally they were heated to 1000° F. in a furnace and held at this temperature for 2 hours.

One hundred grams of the same pellets were impregnated in the same manner with platinum-5% rhodium using platinizing solution prepared according to Example 9.

These catalysts, containing approximately 1% platinum metal, were intended for trial in a high temperature oxidation process.

EXAMPLE 21

A 2″ x 4″ piece of porous polyethylene sheet was warmed with the hot air blower. Ten coats of platinizing solution, prepared as described in Example 7, were applied by brush, each coat being heated with the hot air blower before application of the next. A firmly adherent platinum deposit was built up weighing 78 milligrams. The deposit had a metallic sheen.

EXAMPLE 22

A piece of smooth, non-porous polytetrafluoroethylene sheet measuring 5¾″ x 1½″ was weighed and then masked over one half inch of its width using Scotch Tape No. 470 for masking. This was clipped onto a piece of cardboard, heated with the hot air blower and sprayed with the platinizing solution, per Example 7, using a Wren Air Brush. The heating and spraying operations were alternated until 0.2 gram of platinum had been deposited on the polytetrafluoroethylene exclusive of that deposited on the masking tape. The deposit, somewhat rough as seen under magnification, had a metallic sheen.

A piece of the Scotch Tape 470 was securely pressed onto the platinum deposit and then pulled off. The platinum layer remained firmly adherent to the polytetrafluoroethylene.

Using techniques similar to those described in Examples 21 and 22 adherent platinum deposits have been obtained on polyvinyl chloride sheet, porous polyvinyl chloride sheet, porous polypropylene felt and various ion exchange membranes. Some variations in technique were employed in that the polytetrafluoroethylene was heated somewhat more persistently before the application of the first coat, estimated temperature about 125°–150° C., and then just sufficiently to dry out the platinizing solution after the subsequent coats. The polypropylene felt was coated by simply soaking in the platinum dispersion and allowing to dry partially in the air before applying the blast of hot air. The ion exchange membranes were dried by blowing air on the memrbanes at room temperature or by holding the hot air blower at a distance from the membrane. In every case the platinum layers were strongly adherent to the substrate and to one another.

EXAMPLE 23

A 2″ x 1″ x 5/16″ sillimanite block, representative of the refractory brick used in the lining of glass melting furnaces, was heated to 1000° F., cooled and weighed. It was again heated to 1000° F. in a furnace, withdrawn and one of its 2″ x 1″ surfaces was sprayed with the platinizing solution, prepared in the manner of Example 7, continually until there was a perceptible darkening of the surface. The Wren Air Brush (Binks Mfg. Co.) was used to spray the solution and carbon dioxide was used as the propellant. The block was reheated, this time by means of a gas-compressed air torch. The spraying and heating operations were repeated until a total of 1.01 grams of platinum had been deposited.

This piece was heated to 1900° F. in a furnace. There was no evidence of blistering or loosening of the platinum. Examination under magnification indicated penetration of the platinum into the various recesses in the rough ceramic surface. Further heating with a torch to practically a white heat caused no visible deterioration of the surface.

It is anticipated that this provides a means for obtaining protective platinum coatings on refractories, including refractory coated metals, for high temperature applications.

EXAMPLE 24

A ¼″ square alumina ceramic (Coors body AD–94) 0.025″ thick was platinized on one side in the manner of Example 23. There was 0.003 gram of platinum deposited. A piece of copper wire was silver soldered onto the platinized surface. A firmly adherent bond was formed.

It is apparent that this provides a means for creating a metallic coating on ceramics to which a reliable electrical connection can be made.

EXAMPLE 25

A 2″ diameter watch glass was heated to 850° F. in a furnace, withdrawn and sprayed with the platinizing solution as in Examples 23 and 24.

The platinum backed glass was an excellent mirror.

A number of advantages result from the use of the platinizing solutions of this invention. Catalytic deposits free of chlorides are obtained and this is a very desirable feature. Active catalysts can be produced on high fired, inactive, ceramic supports as well as on the highly activated supports normally used with platinum. Such deposits are durable and not readily worn away. A considerable advantage results from the fact that these deposits can be obtained at low temperatures so that limitations on substrates or on the design of supporting structures are not as restrictive as when higher temperature processes are used. Titanium electrode structures, for example, are liable to distortion when heated to temperatures on the order of 500° C. as is necessary when using other compositions for "chemi-deposition" of platinum or in the various activating processes given electroplated deposits. In comparison with deposits obtained by electroplating the major advantage of course lies in the activity of this deposit. Other advantages result from the fact that no laborious masking is necessary to confine the platinum to areas where it will serve a useful purpose nor, since an electroplated platinum undercoat is not necessary, must a large amount of platinum be tied up in a plating bath. The latter is an important point when considering the size of some of the structures planned for use in the electrolytic production of chlorine. Regarding fuel cell electrodes it is of interest to note that this composition affords the opportunity to apply catalytic deposits to the conducting powders (carbon, nickel, tantalum, titanium, tungsten, etc.) used in the fabrication of these electrodes or, alternatively, to porous electrodes preformed from any of these materials. The applicability of these platinizing solutions to a wide variety of substrates, the quicker turnover of platinum and other advantages have been pointed out previously in the text.

Unless otherwise indicated, percentages are by weight.

Mesh are Tyler standard mesh per linear inch.

In the context of this application it will be understood that a platinum metal is a metal of the class consisting of rhodium, ruthenium, iridium and palladium, and platinum.

It will be evident that the concentration of platinum metals in the dispersion may be between 1 and 500 grams per liter.

Having thus described my invention what I claim as new and desire to secure by Letters Patent is:

1. A process of dispersing platinum which comprises reacting together (1) an oxide of the class consisting of platinum oxide and mixtures of platinum oxide with at least one oxide of the class consisting of rhodium oxide, ruthenium oxide, iridium oxide and palladium oxide, and mixtures thereof, in which platinum forms at least 50% of the metal content, (2) with a solution of an aliphatic alcohol between $C_2$ and $C_5$ inclusive, in the presence of formaldehyde less than 37% by weight of the solution.

2. A process of claim 1, in which said ingredients are mixed in an atmosphere of an inert gas.

3. A platinum dispersion produced by the process of claim 1.

4. A platinum deposit produced by depositing a dispersion made in accordance with claim 1 on a substrate.

5. A platinized electrode comprising a base of an electrically conductive material, having a platinum metal deposit thereon produced by depositing a dispersion made in accordance with claim 1 on the base.

6. A process of claim 1, which further comprises heating to bring about the reduction of the oxide and the dispersion of the platinum.

7. A process of claim 6, in which said ingredients are mixed in an atmosphere of an inert gas.

8. A platinum dispersion produced by the process of claim 6.

9. A platinum deposit produced by depositing a dispersion made in accordance with claim 6 on a substrate.

10. A platinized electrode comprising a base of an electrically conductive material, having a platinum metal deposit thereon produced by depositing a dispersion made in accordance with claim 6 on the base.

11. A process of claim 1 in which the solution essentially comprises a mixture of aliphatic alcohols from $C_2$ to $C_5$ inclusive.

12. A platinum dispersion produced by the process of claim 11.

13. A platinum deposit produced by depositing a dispersion made in accordance with claim 11 on a substrate.

14. A platinized electrode comprising a base of an electrically conductive material, having a platinum metal deposit thereon produced by depositing a dispersion made in accordance with claim 11 on the base.

15. A process of claim 11, in which said ingredients are mixed in an atmosphere of an inert gas.

References Cited

UNITED STATES PATENTS

| | | | |
|---|---|---|---|
| 3,099,575 | 7/1963 | Hill | 117—22 X |
| 3,265,526 | 8/1966 | Beer | 117—227 |
| 3,281,282 | 10/1966 | Barber | 117—227 |

FOREIGN PATENTS 904,936    9/1962    Great Britain.

WILLIAM L. JARVIS, Primary Examiner

U.S. Cl. X.R.

106—1; 117—123, 160, 230; 204—98; 252—470